(12) United States Patent
Šestan et al.

(10) Patent No.: US 12,627,634 B2
(45) Date of Patent: May 12, 2026

(54) SYSTEMS AND METHODS FOR ARTIFICIAL TRAFFIC DETECTION

(71) Applicant: Infobip Ltd., London (GB)

(72) Inventors: Jasmina Šestan, Zagreb (HR); Timotej Jarc, Samobor (HR); Dario Filipović, Zagreb (HR)

(73) Assignee: Infobip Ltd., London (GB)

( * ) Notice: Subject to any disclaimer, the term of this patent is extended or adjusted under 35 U.S.C. 154(b) by 341 days.

(21) Appl. No.: 18/307,906

(22) Filed: Apr. 27, 2023

(65) Prior Publication Data

US 2024/0333683 A1      Oct. 3, 2024

Related U.S. Application Data

(60) Provisional application No. 63/493,351, filed on Mar. 31, 2023.

(51) Int. Cl.
*H04L 9/40* (2022.01)
*G06F 9/54* (2006.01)

(52) U.S. Cl.
CPC .......... *H04L 63/0236* (2013.01); *G06F 9/542* (2013.01); *H04L 63/1425* (2013.01)

(58) Field of Classification Search
None
See application file for complete search history.

(56) References Cited

U.S. PATENT DOCUMENTS

| | | | |
|---|---|---|---|
| 9,729,727 B1 | 8/2017 | Zhang | |
| 2016/0078229 A1* | 3/2016 | Gong | .................... G06F 21/577 726/24 |
| 2020/0259933 A1* | 8/2020 | Goodyear | .............. G06N 20/00 |

FOREIGN PATENT DOCUMENTS

| | | |
|---|---|---|
| CN | 109274836 A | 1/2019 |
| CN | 109587350 A | 4/2019 |
| CN | 111918226 A | 11/2020 |
| EP | 3324607 A1 | 5/2018 |

* cited by examiner

*Primary Examiner* — Syed A Roni

(74) *Attorney, Agent, or Firm* — Bookoff McAndrews, PLLC

(57) ABSTRACT

Systems and methods for analyzing communication traffic may include receiving message events, aggregating the message events to generate aggregated message events, receiving a destination address, performing traffic analysis for the destination address based on the aggregated message events, wherein the traffic analysis comprises determining an analyzer score for each of the message events associated with the destination address, calculating a risk score based on the analyzer score for each of the message events associated with the destination address; and performing a risk action for the destination address based on the risk score.

22 Claims, 7 Drawing Sheets

<u>300</u>

300

302 RECEIVE MESSAGE EVENTS

304 AGGREGATE MESSAGE EVENTS

306 PERFORM TRAFFIC ANALYSIS BASED ON AGGREGATED MESSAGE EVENTS

308 CALCULATE RISK SCORE BASED ON TRAFFIC ANALYSIS

310 PERFORM RISK ACTION BASED ON CALCULATED RISK SCORE

SYSTEMS AND METHODS FOR ARTIFICIAL TRAFFIC DETECTION

CROSS-REFERENCE TO RELATED APPLICATIONS

This application claims priority to U.S. Provisional Application No. 63/493,351 filed Mar. 31, 2023, the entire disclosure of which is hereby incorporated by reference in its entirety.

TECHNICAL FIELD

Various embodiments of the present disclosure relate generally to identifying risk associated with communication traffic and, more specifically, to determining risk scores for destination addresses (e.g., phone numbers).

BACKGROUND

Communication databases often include a large volume of recipient addresses (e.g., phone numbers) that can be added to the communication databases from various sources. Often, such recipient addresses include valid recipient addresses (e.g., corresponding to user devices) as well as artificial addresses (e.g., corresponding to non-user devices, to spoofed addresses, to fraudulent addresses, etc.). Transmitting communication to such artificial addresses can be resource intensive and/or can reduce a trust rating of an entity transmitting such messages.

The background description provided herein is for the purpose of generally presenting the context of the disclosure. Unless otherwise indicated herein, the materials described in this section are not prior art to the claims in this application and are not admitted to be prior art, or suggestions of the prior art, by inclusion in this section.

SUMMARY OF THE DISCLOSURE

According to certain aspects of the disclosure, methods and systems are disclosed for identifying risk associated with communication traffic.

In one aspect, an exemplary embodiment of a method for analyzing communication traffic may include receiving message events; aggregating the message events to generate aggregated message events; receiving a destination address; performing traffic analysis for the destination address based on the aggregated message events, wherein the traffic analysis comprises determining an analyzer score for each of the message events associated with the destination address; calculating a risk score based on the analyzer score for each of the message events associated with the destination address; and performing a risk action for the destination address based on the risk score.

In another aspect, an exemplary embodiment of a system may include a data storage device storing processor-readable instructions and a processor operatively connected to the data storage device and configured to execute the instructions to perform operations that may include receiving message events; aggregating the message events to generate aggregated message events; receiving a destination address; performing traffic analysis for the destination address based on the aggregated message events, wherein the traffic analysis comprises determining an analyzer score for each of the message events associated with the destination address; calculating a risk score based on the analyzer score for each of the message events associated with the destination address; and performing a risk action for the destination address based on the risk score.

In another aspect, an exemplary embodiment of a method for managing traffic may include receiving a request for a risk score for a destination address; identifying message events stored in a database and associated with the destination address; receiving analyzer scores for each of the message events, each analyzer score of the analyzer scores output by an overall machine learning model, the overall machine learning model outputting the analyzer scores based on outputs of a plurality of criteria machine learning models; calculating a risk score for the destination address based on the analyzer scores for each of the message events; and providing the risk score via an application programing interface (API).

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

DETAILED DESCRIPTION OF EMBODIMENTS

Figure 1A:
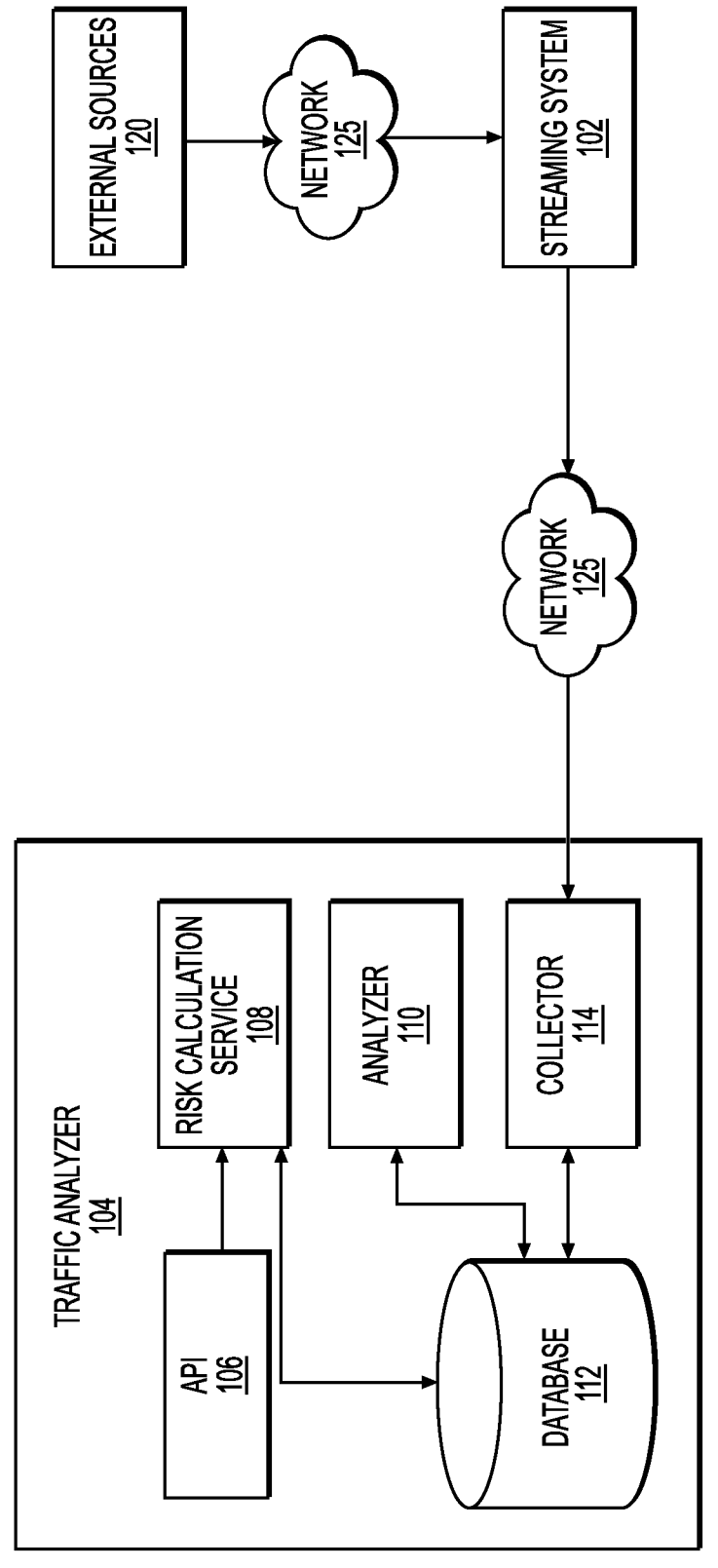
FIG. 1A depicts an exemplary system diagram for communication traffic analysis, according to one or more embodiments.

According to certain aspects of the disclosure, methods and systems are disclosed for traffic analysis for analyzing risk associated with communication traffic. As disclosed herein, a risk score may be calculated for one or more communication addresses. The one or more communication addresses may be associated with destination (e.g., recipient) nodes. The destination nodes may include valid nodes (e.g., user nodes, user devices, mobile devices, computer devices, personal devices, wearable devices, etc.) and/or artificial nodes (e.g., non-user devices, bot addresses, spoofed addresses, fraudulent addresses, etc.). A risk score may be used to distinguish valid nodes from artificial nodes, as disclosed herein.

Although phone numbers are generally discussed herein, the subject matter disclosed herein may apply to any applicable destination address such as, but not limited to, mobile phone numbers, landline numbers, voice over IP (VOIP) numbers, non-numeric destination addresses, device identifiers, system identifiers, account identifiers, provider identifiers, or the like or a combination thereof.

According to implementations of the disclosed subject matter, a streaming system may receive and transmit message events to a collector (e.g., a data aggregator). The streaming system may receive message events (e.g., associated with Short Message Service Messages (SMS), mobile messages, push messages, pull messages, in-app messages, etc.) from one or more communication streams that may provide real-time or near real-time message events to the collector. The message events may include attributes about each respective message event such as, but not limited to, an address (e.g., a phone number) associated with a message, a time associated with a message, source information, or the like or a combination thereof. The streaming system may be a single data system (e.g., a data broker) or a cluster of data systems (e.g., data brokers). The streaming system may index the real-time or near real-time message events received from the one or more streams and may transmit the indexed message events to the collector.

The collector may aggregate the received message events and store them in a database. The database may include current and historical message events in an indexed and/or searchable format such that the current and/or historical message events can be accessed by a traffic analyzer. The database may be a structured database (e.g., a structured query language (SQL) based database such as PostgreSQL). The traffic analyzer may analyze the stored message events in accordance with the techniques disclosed herein. The traffic analyzer may provide an analyzer score for a given message event based on the analysis, and the analyzer score may be stored at the database. The analyzer score for a given message event may be stored such that the analyzer score is associated with the respective message event (e.g., based on a stored location, a pointer, etc.). Each message event may have a message attribute associated with the message event. For example, each message event may correspond to one or more destination addresses (e.g., phone number, phone numbers, etc.). Accordingly, the analyzer score for a message event may be associated with the message attribute (e.g., destination score) corresponding to the message event.

According to implementations of the disclosed subject matter, a client component (e.g., a device, a program, a server, a database, a platform, etc.) may transmit a request for a risk score associated with a destination address. The client component may transmit the request via an application programing interface (API). The API may receive the transmitted request and access a risk calculation service to retrieve the risk score associated with the destination address. The risk calculation service may request the analyzer scores associated with the destination address from the database. The database may provide each or a subset of the analyzer scores associated with the destination address to the risk calculation service, based on the request. The risk calculation service may determine a risk score for the destination address, based on the analyzer scores provided by the database and associated with the destination address. Accordingly, in accordance with the techniques disclosed herein, risk scores for a given destination address may be determined based on one or more analyzer scores associated with the destination address.

According to other implementations of the disclosed subject matter, a risk calculation service may request the analyzer scores associated with a destination address from the database. The database may provide each or a subset of the analyzer scores associated with the destination address to the internal risk calculation service, based on the request. The risk calculation service may determine a risk score for the destination address, based on the analyzer scores provided by the database and associated with the destination address. If the risk score exceeds a threshold risk score, communication to the destination address may be blocked (e.g., the destination address may be added to a blacklist). If the risk score is under a second threshold risk score, or under the threshold risk score, communication to the destination address may be enabled without future analysis (e.g., the destination address may be added to a white list). A risk score between the second threshold score and the threshold score may cause the destination address to be designated as a monitored address. Communication associated with a monitored address may be restricted, may be evaluated further, or may be flagged as such. For example, one or more additional fraud or risk filters may be applied to such communication, prior to releasing such communication.

Reference to any particular activity is provided in this disclosure only for convenience and not intended to limit the disclosure. A person of ordinary skill in the art would recognize that the concepts underlying the disclosed devices and methods may be utilized in any suitable activity. The disclosure may be understood with reference to the following description and the appended drawings, wherein like elements are referred to with the same reference numerals.

The terminology used herein may be interpreted in its broadest reasonable manner, even though it is being used in conjunction with a detailed description of certain specific examples of the present disclosure. Indeed, certain terms may even be emphasized below; however, any terminology intended to be interpreted in any restricted manner will be overtly and specifically defined as such in this Detailed Description section. Both the foregoing general description and the following detailed description are exemplary and explanatory only and are not restrictive of the features, as claimed.

In this disclosure, the term "based on" means "based at least in part on." The singular forms "a," "an," and "the" include plural referents unless the context dictates otherwise. The term "exemplary" is used in the sense of "example" rather than "ideal." The terms "comprises," "comprising," "includes," "including," or other variations thereof, are intended to cover a non-exclusive inclusion such that a process, method, or product that comprises a list of elements does not necessarily include only those elements, but may include other elements not expressly listed or inherent to such a process, method, article, or apparatus. The term "or" is used disjunctively, such that "at least one of A or B" includes, (A), (B), (A and A), (A and B), etc. Relative terms, such as, "substantially," "approximately," and "generally," are used to indicate a possible variation of +10% of a stated or understood value. In this disclosure, the term "higher" refers to more, greater than, or up. In this disclosure, the term "lower" refers to below, less than, or down.

As used herein, a "machine learning model" generally encompasses instructions, data, and/or a model configured to receive input, and apply one or more of a weight, bias, classification, or analysis on the input to generate an output. The output may include, for example, a classification of the input, an analysis based on the input, a design, process, prediction, or recommendation associated with the input, or any other suitable type of output. A machine learning model is generally trained using training data, e.g., experiential data and/or samples of input data, which are fed into the model in order to establish, tune, or modify one or more aspects of the model, e.g., the weights, biases, criteria for forming classifications or clusters, or the like. Aspects of a machine learning model may operate on an input linearly, in parallel, via a network (e.g., a neural network), or via any suitable configuration. Output from a first machine learning model may be provided as an input to a second machine learning model such that the first and second machine learning models may both be used to generate an output.

The execution of the machine learning model may include deployment of one or more machine learning techniques, such as linear regression, logistical regression, random forest, gradient boosted machine (GBM), deep learning, and/or a deep neural network. Supervised and/or unsupervised training may be employed. For example, supervised learning may include providing training data and labels corresponding to the training data, e.g., as ground truth. Unsupervised approaches may include clustering, classification or the like. K-means clustering or K-Nearest Neighbors may also be used, which may be supervised or unsupervised. Combinations of K-Nearest Neighbors and an unsupervised cluster technique may also be used. Any suitable type of training may be used, e.g., stochastic, gradient boosted, random seeded, recursive, epoch or batch-based, etc.

FIG. 1A depicts an exemplary system 100 for analyzing communication traffic using traffic analyzer 104, according to one or more embodiments, and which may be used with the techniques presented herein. System 100 may include system components including external source 120, streaming system 102, network 125, traffic analyzer 104, API 106, risk calculation service 108, analyzer 110, collector 114, and/or database 112. While only one of each of these system components is depicted, two or more of any or each of these system components may be implemented in accordance with the techniques disclosed herein. It will be understood that the techniques disclosed herein may be implemented with all or a subset of the components of the systems (e.g., system 100) disclosed herein.

One or more of the system components may be connected via a network 125, using one or more standard communication protocols. Network 125 may be one or a combination of the Internet, a local network, a private network, or other network. The same network 125 or different networks 125 may facilitate communication between two or more system components and such communication or networks are not limited by the example shown in system 100.

Figure 1B:
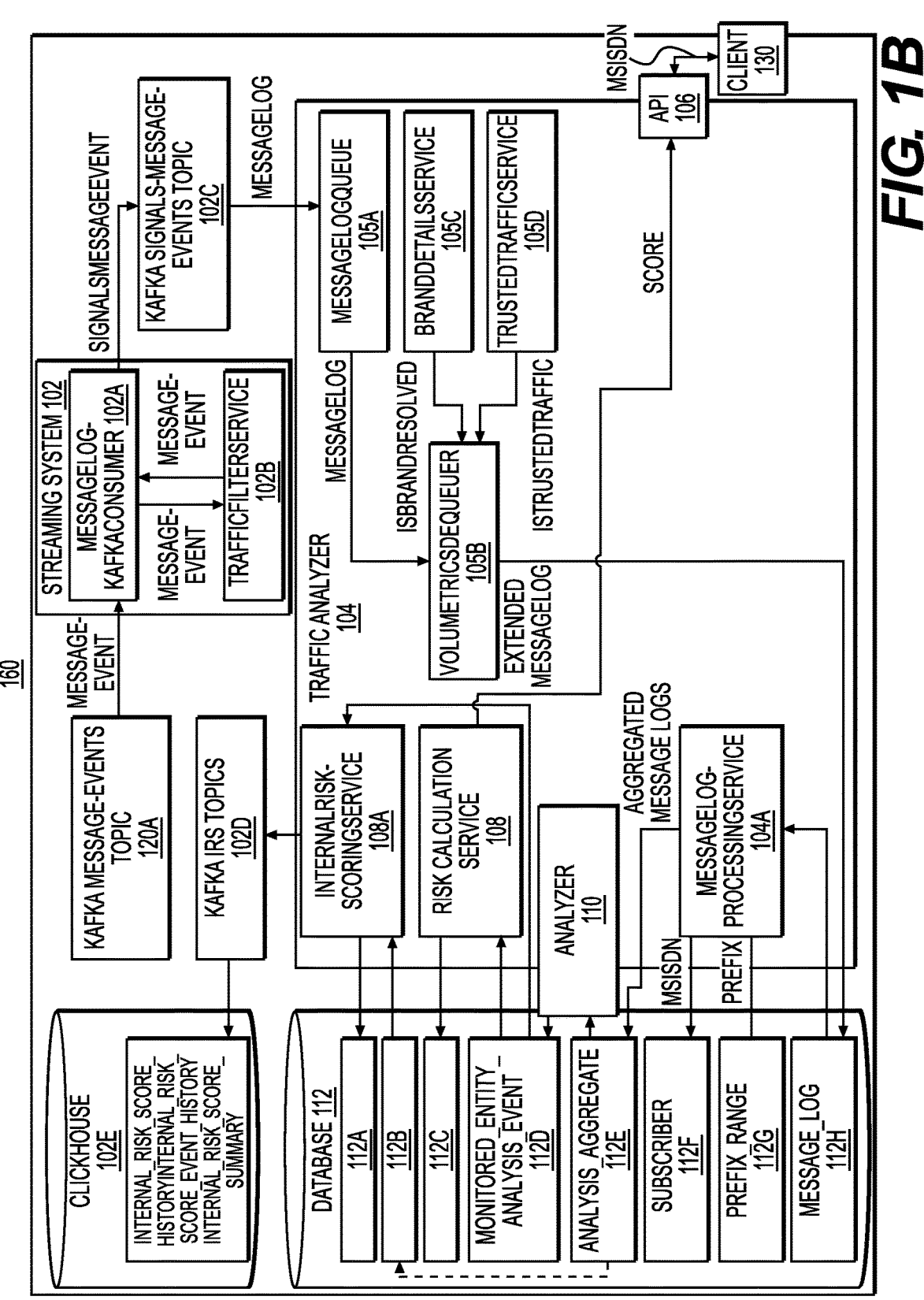
FIG. 1B depicts another exemplary system diagram for communication traffic analysis, according to one or more embodiments.

Some or all of the system components show in system 100 or system 160 of FIG. 1B, as further discussed herein, may include a processor, a memory, and/or a network interface. The system components may be or may be implemented using a computer, system of computers (e.g., rack server(s)), and/or a cloud service computer system. Some or all of the system components may execute, by one or more processors, an operating system (O/S). A given memory of some or all of the system components may also store one or more instances of a machine learning model (e.g., secure machine learning model, risk machine learning model, sanitation model etc.) as well as one or more model states. Some or all of the system components may include a network interface that may be a TCP/IP network interface for, e.g., Ethernet or wireless communications with the network 125.

In various embodiments, the network 125 may be a wide area network ("WAN"), a local area network ("LAN"), personal area network ("PAN"), or the like. In some embodiments, electronic network 125 includes the Internet, and information and data provided between various systems occurs online. "Online" may mean connecting to or accessing source data or information from a location remote from other devices or networks coupled to the Internet. Alternatively, "online" may refer to connecting or accessing an electronic network (wired or wireless) via a mobile communications network or device. The Internet is a worldwide system of computer networks-a network of networks in which a party at one computer or other device connected to the network can obtain information from any other computer and communicate with parties of other computers or devices. The most widely used part of the Internet is the World Wide Web (often-abbreviated "WWW" or called "the Web"). A "website page" generally encompasses a location, data store, or the like that is, for example, hosted and/or operated by a computer system so as to be accessible online, and that may include data configured to cause a program such as a web browser to perform operations such as send, receive, or process data, generate a visual display and/or an interactive interface, or the like.

Although depicted as separate system components in FIG. 1A and FIG. 1B, it should be understood that a component or portion of a component in the exemplary system 100 and/or exemplary system 160 may, in some embodiments, be integrated with or incorporated into one or more other components. Any suitable arrangement and/or integration of the various systems and devices of the exemplary system 100 or system 160 may be used.

Returning to FIG. 1A, external sources such as external source 120 may each be different communication streams. Each external source may be associated with one or more communication types (e.g., SMS messages, mobile messages, VOIP messages, internet based messages, push messages, pull messages, in-app messages, etc.). External sources, such as external source 120, may feed message events to streaming system 102 (e.g., via network 125). Streaming system 102 may provide the message events to collector 114 of traffic analyzer 104. Streaming system 102 may transmit raw message event data to collector 114. Alternatively, or in addition, streaming system 102 may perform an action or otherwise transform message events prior to providing the message events to collector 114. For example, streaming system 102 may index the message events or configure the message events for indexing, prior to providing the message events to collector 114.

Collector 114 may aggregate the message events received from streaming system 102 (e.g., received via network 125). Collector 114 may store the message events at database 112. Database 112 may be, for example, a relational database and may index and store the message events. As an example, the database may index the message events such that they are stored as associated with one or more message attributes. The message events may be stored such that they are associated with corresponding addresses (e.g., source addresses, destination addresses, etc.) associated with the message events.

Analyzer 110 may receive indexed message events stored in database 112 and perform traffic analysis based on the indexed message events. Analyzer 110 may analyze the indexed message events to determine an analyzer score for each of the message events. Analyzer 110 may determine an analyzer score for each message event based on the indexed data associated with the message event, based on indexed data associated with other message events, based on indexed data associated with message events having overlapping or associated message properties (e.g., destination addresses, source addresses, timing associated with one or more messages, etc.), and/or the like.

According to an implementation, analyzer 110 may determine an analyzer score based on an address received count such as an MSISDN_RECEIVED_COUNT (Mobile Station Integrated Services Digital Network (MSISDN) received count). An MSISDN received count may be a count of the number of message events associated with (e.g., received from, transmitted to, or a combination thereof) a given MSISDN. For example, the MSISDN received count may be a count of the number of messages associated with a given MSISDN within a threshold period of time (e.g., 24 hours). According to an implementation, a greater MSISDN count or a MSISDN count over a threshold value may result in a higher risk analyzer score.

According to another implementation, analyzer 110 may determine an analyzer score based on a PREFIX_RE-CEIVED_COUNT (Prefix received count). The prefix received count may correspond to the number of message events associated with a given prefix of an address (e.g., an MSISDN). A prefix of an address may be a given number of initial digits for a given type of address (e.g., an MSISDN). For example, an MSISDN may include fifteen digits and a prefix of the MSISDN may be the first twelve digits of those fifteen digits. Accordingly, the prefix received count may correspond to the number of messages associated with the MSISDNs having the first twelve digits of the fifteen digit MSISDN. The prefix received count may be associated with each of the message events that have the same prefix of an address. According to an implementation, a greater prefix received count or a prefix received count over a threshold value may result in a higher risk analyzer score.

According to another implementation, analyzer 110 may determine an analyzer score based on a PREFIX_ERROR-_RATE (prefix error rate). The prefix error rate may be determined for each of the message events associated with a given prefix of an address (e.g., an MSISDN). The prefix error rate may correspond to the number of errors (e.g., undelivered messages, unknown address flag, flagged routing information, etc.) detected for a group of prefix addresses. According to the fifteen-digit MSISDN example provided above, the prefix error count may correspond to the number of errors associated with the MSISDNs having the first twelve digits of the fifteen digit MSISDN. The prefix error rate may be associated with each of the message events that have the same prefix of an address. According to an implementation, a greater prefix error rate or a prefix error rate over a threshold value may result in a higher risk analyzer score.

According to another implementation, analyzer 110 may determine an analyzer score based on an address classification. Analyzer 110 or another system component of system 100 or system 160 may receive an address classification for an address associated with a message event from an address classification database. The address classification database may be an external source (e.g., external source 120) that may maintain address classifications. An address classification may be, for example, an address rank (e.g., a premium rank, a standard rank, etc.), a type of address (e.g., a user address, a user device address, an entity address, etc.), or the like. For example, the address classification for a given address (e.g., a phone number, an MSISDN, etc.) may indicate that the given address is classified as an entity address (e.g., not associated with a user and/or not configured to receive communication). Accordingly, the given address may be associated with a higher risk analyzer score based on the address being classified as an entity address.

An analyzer score for a given message event may be based on one or more analyses performed by analyzer 110. For example, an analyzer score for a given message event may be based on one or more of an MSISDN received count, a prefix received count, a prefix error rate, and/or an address classification. It will be understood that although specific analyses performed by analyzer 110 are disclosed herein, analyzer 110 is not limited to these analyses and one or more other analyses may be performed to determine an analyzer score for a message event. According to an implementation, an analyzer score and/or risk score may be provided by a user or a system component (e.g., via a manual override). In addition to the techniques discussed above, analyzer scores may be determined based on one or more of a type of message, a certainty (e.g., a certainty score based on a confidence associated with a message event), a timestamp, a client or entity (e.g., based on client provided metrics, based on association with a client, etc.), one or more weights, decay (e.g., using a decay coefficient determined based on the duration of time that a message event is queried and a message timestamp, which decay may cause the relevance of the analyzer score for a given message event to decrease over time), or the like.

The analyzer score may be determined by incorporating a time factor, which may consider the event time and a decay metric. For example, the time factor may be a product or result of another relationship between the event timestamp and a predetermined decay value. The time factor may be modified by a certainty score, for example as a sum or product with the time factor. The resulting time factor/certainty score metric may be further modified by a weight, for example using a product, to produce a share of an event. A sum of shares for each relevant event may be the final analyzer score.

As an example, an analyzer score for a given message event may be determined based on a corresponding base analyzer score (e.g., 70, as determined by analyzer 110), a timestamp (e.g., 5 days prior), a decay coefficient (e.g., $-1.11$), and weight (e.g., 60). According to this example, an analyzer score for the given message event may be calculated as:

$$(70 + (5 * -1.11)) * (60/100) = 38.67 \qquad \text{(Example Calculation 1)}$$

In Example Calculation 1, value 70 corresponds to the base analyzer score, value 5 corresponds to the number of elapsed days based on the timestamp, value $-1.11$ corresponds to the decay coefficient (e.g., as may be predetermined or output by a machine learning model), and value 60 corresponds to the weight (e.g., as may be predetermined or output by a machine learning model). As an example, the analyzer score may be reset after or over a threshold period of time (e.g., 90 days). Accordingly, they analyzer score may decay over the threshold period of time (e.g., decay to 0 after 90 days). With certain implementations, an analyzer score may decay faster (e.g., the decay coefficient may be increased) or slower (e.g., the decay coefficient may be decreased) based on given behavior (e.g., actions with negative or unwanted associations).

According to another example, an analyzer score based on a number of base analyzer scores may be determined based on the following:

$$\text{score} = \sum\nolimits_{i=1}^{n} (\text{weight}_i \cdot (\text{analysis}_i - \text{decay}_i \cdot \text{period}_i)) \qquad \text{(Example Equation 1)}$$

In Example Equation 1, n corresponds to the number of base analyses that contribute to an analyzer score, $\text{weight}_i$ corresponds to a weight coefficient for $i^{th}$ analysis, $\text{analysis}_i$ corresponds to the score of $i^{th}$ analysis, $\text{decay}_i$ corresponds to a decay coefficient for $i^{th}$ analysis, $\text{period}_i$ corresponds to a period (e.g., time passed) after $i^{th}$ analysis is calculated and/or stored, and may be expressed, for example, as an amount of time (e.g., days, hours, etc.).

According to an implementation, if a determined analyzer score exceeds a threshold score, the analyzer score may be determined to be the threshold score. For example, an analyzer score determined in accordance with Example Calculation 1 or Example Equation 1 that is greater than 99 may be decreased to or held at 99.

According to implementations, an analyzer score may be determined based on one or more other factors such as trusted destinations, traffic behavior, etc. For example, if a client confirms that a given destination address is trusted, the score associated with that destination and/or client may be 0. As another example, if the traffic associated with a given period of time and/or a given location increases beyond an expected traffic amount by a threshold amount, the analyzer scores for message events based on that traffic may be decreased. As another example, if there are unexplainable and/or unexpected traffic increases for a given location or network, analyzer scores for message events associated with such traffic may be increased.

As used herein, a decay coefficient may determine the rate of decrease of a given analyzer score (e.g., based on a duration of time). For example, a decay coefficient of 1.11 may cause (e.g., linearly) an analyzer score of 100 to decrease to 0 in 90 days.

As used herein, a weight coefficient may determine the extent to which a given base analyzer score contributes to an analyzer score. A base analyzer score may be multiplied by its corresponding weight coefficient. For example, if a base analyzer score is 80 and its corresponding weight coefficient is 0.7, then that base analyzer score may contribute a score of 56 towards the analyzer score.

Other weights and/or coefficients may be applied when determining an analyzer score. For example, a network coefficient may increase or decrease a base analyzer score based on a destination network. A brand coefficient may increase or decrease a base analyzer score based on a given brand associated with a message event.

According to implementations, one or more coefficients may be determined statistically based on, for example, traffic patterns and/or behavior. Such coefficients may be based on fraudulent behavior and/or analysis indicating a duration of time such behavior is considered fraudulent. One or more coefficients may be determined using machine learning, as discussed herein. For example, one or more weight coefficients may be output by a machine learning model trained to output linear or non-linear weight coefficients. The machine learning model may be trained based on historical or simulated data that may be tagged or untagged.

According to implementations of the disclosed subject matter, analyzer 110 may determine an analyzer score based on one or more of the criteria provided below. The following criteria may be used to generate a weight to adjust an analyzer score or a coefficient to adjust a risk score that is based on one or more analyzer scores. As discussed below, one or more criteria machine learning models may be used to output criteria specific weights and/or coefficients.

Traffic burst: for example, based on a high traffic volume increase for a given brand and/or mobile network operator (MNO) in short period of time, a burst score during that period for that brand and/or MNO may be unfavorable. The traffic volume for a given brand and/or MNO may be determined based on monitoring traffic tagged as being associated with the given brand and/or MNO. For example, a brand identifier and/or MNO identifier may be associated with respective messages from a brand and/or MNO. One or more of the components disclosed herein may monitor a number of instances of a respective brand identifier and/or MNO identifier for one or more given periods of time (e.g., an hour, a day, a week, a month, etc.). The number of instances may be used to identify traffic volume for the given brand and/or MNO. A weight or coefficient may be output based on the traffic volume. For example, a machine learning model may output the weight or coefficient based on the number of instances, historical number of instances, expected number of instances, and/or the like.

Prefix ranges exist or there are sequences in ranges: for example, prefixes (e.g., MSISDN prefixes, as discussed herein) with a high count of distinct destinations or prefixes with destinations having a sequence may indicate artificial traffic, and may result in an unfavorable analyzer score.

Conversion rate drop: for example, when a conversion rate for a given brand is lower than usual, a conversion rate score may be unfavorable for some destinations for the given brand. Conversion rates may be provided by a brand or MNO and may be provided to a machine learning model trained to output a weight or coefficient based on the same. The machine learning model may output the weight or coefficient based on the conversion rate, historical conversion rates, expected conversion, conversion rates for one or more other bands, and/or the like.

Delivery rate drop: for example, when a delivery rate drops due to sending messages to destinations that are not legitimate (e.g., fraudulent, artificial, etc.), those destinations may be associated with an unfavorable analyzer score. Delivery rates may be determined by a component disclosed herein and/or may be provided by a brand or MNO. The delivery rates may be provided to a machine learning model trained to output a weight or coefficient based on the same. The machine learning model may output the weight or coefficient based on a delivery rate, historical delivery rates, expected delivery rates, delivery rates for one or more other bands, and/or the like.

Message destination time clustering: for example, when multiple destinations receive an equal number of messages from a given brand at similar times (e.g., approximately 20 destinations receive approximately 10 messages in approximately 30 minutes) analyzer scores for such destinations may be unfavorable. Such number of messages may be determined by a component disclosed herein and/or may be provided by a brand or MNO. Such number of messages may be provided to a machine learning model trained to output a weight or coefficient based on the same. The machine learning model may output the weight or coefficient based on a number of such messages, historical messages, expected message numbers, message numbers for one or more other bands, and/or the like.

Destinations with same number of messages: for example, destinations with a same number of received messages from a given brand may be associated with an unfavorable analyzer score. Such number of messages may be determined by a component disclosed herein and/or may be provided by a brand or MNO. Such number of messages may be provided to a machine learning model trained to output a weight or coefficient based on the same. The machine learning model may output the weight or coefficient based on a number of such messages, historical messages, expected message numbers, message numbers for one or more other bands, and/or the like.

Message frequency per destination: for example, when messages are sent from a given brand to given destinations repeatedly over a threshold period of time (e.g., destinations that receive one message every day over one week), those destinations may be associated with an unfavorable analyzer score. Such number of messages may be determined by a component disclosed herein and/or may be provided by a brand or MNO. Such number of messages may be provided to a machine learning model trained to output a weight or coefficient based on the same. The machine learning model may output the weight or coefficient based on a number of such messages, historical messages, expected message numbers, message numbers for one or more other bands, and/or the like.

Destinations in existing suspicious range: for example, destinations that contributed to unfavorable prefix analyses may be associated with a more unfavorable analyzer score than those destinations from that prefix which did not have traffic. Such prefix analysis may be determined by a component disclosed herein and/or may be provided by a brand or MNO. Such prefix analysis may be provided to a machine learning model trained to output a weight or coefficient based on the same. The machine learning model may output the weight or coefficient based on prefix analysis score, historical prefix analysis scores, expected prefix analysis scores, prefix analysis scores for one or more other bands, and/or the like.

Suspicious destination types: for example, destinations may be classified into different types based on external sources. Some destination types may be considered suspicious (e.g., if a given destination type is classified as premium rate, such destinations should not receive SMS message). Destinations corresponding to a suspicious type may be associated with unfavorable analyzer scores. A destination type may be determined by a component disclosed herein and/or may be provided by a brand or MNO. Such destination type(s) may be provided to a machine learning model trained to output a weight or coefficient based on the same. The machine learning model may output the weight or coefficient based on destination type(s), historical destination types, expected destination types, destination types for one or more other destinations, and/or the like.

Traffic to foreign country: for example, if there is a significant volume of traffic to foreign countries, or certain predetermined foreign countries, such message events may be associated with unfavorable analyzer scores. A destination locale may be determined by a component disclosed herein and/or may be provided by a brand or MNO. Such destination locale(s) may be provided to a machine learning model trained to output a weight or coefficient based on the same. The machine learning model may output the weight or coefficient based on destination locale(s), historical destination locales, expected destination locales, destination locales for one or more other destinations, and/or the like.

Network-level anomaly: for example, when there is an increase in traffic on a given MNO in comparison to the given MNO's market share, destinations associated with that MNO may be associated with unfavorable analyzer scores. Such traffic may be analyzed in accordance with the techniques disclosed herein.

Disposable phone numbers: for example, certain websites may provide disposable phone numbers that rotate over time. Such phone numbers may be considered fraudulent. Destinations marked as disposable (e.g., by a third party) may be associated with unfavorable analyzer scores. Such destination types may be determined in accordance with the techniques disclosed herein.

Multiple brand interaction: for example, certain websites may provide disposable phone numbers that rotate over time. One way to detect such rotating phone numbers or such websites may be based on a sudden jump in a number of messages over multiple brands. Such detected destinations may be associated with unfavorable analyzer scores. Such detected destination types may be determined in accordance with the techniques disclosed herein.

Ported destinations: ported destinations may be considered less risky. For example, destinations that recently switched their MNO (e.g., are ported to another MNO) may be considered less risky as they be associated with a valid user. Such destinations may be associated with unfavorable analyzer scores. Such destination types may be determined in accordance with the techniques disclosed herein.

Destinations with initiated messages: destinations with initiated messages may be considered lower risk. For example, destinations that previously sent messages over a trusted platform or had traffic over a trusted customer portal may be considered lower risk as they may be associated with a valid user. Such destinations may be associated with a favorable analyzer score. Such destination types may be determined in accordance with the techniques disclosed herein.

Conversion information: for example, when destination previously reacted/converted based on message from a given brand, such destination may be considered as less risky for future messages and corresponding analyzer scores may be favorable. The conversion information for a given destination and/or brand may be determined based on monitoring traffic and traffic interaction by one or more components disclosed herein. For example, a conversion identifier may be associated with respective messages from a brand and/or MNO. One or more of the components disclosed herein may monitor a number of instances of a given conversion identifier (e.g., opened, interacted with, deleted, unopened, etc.) for one or more given periods of time (e.g., an hour, a day, a week, a month, etc.). The number of instances may be used to identify conversion rates for the given destination and/or brand. A weight or coefficient may be output based on the conversion rates. For example, a machine learning model may output the weight or coefficient based on the number of each type of conversion, historical conversions, expected conversions, and/or the like.

Client classified destination as trusted: for example, when a trusted client provides information that a given destination belongs to a valid end-user, then other scores for those destinations may be ignored and they may be associated with a favorable analyzer score (e.g., 0). Such destination classifications may be determined in accordance with the techniques disclosed herein.

An analyzer score, as discussed herein, may be a positive or negative analyzer score (e.g., an analyzer score between 0 and 100, an analyzer score between −10 and +10, or any predefined range, etc.). For example, a low MSISDN received count may contribute to a lower (e.g., lower risk) analyzer score whereas a high MSISDN received count may contribute to a higher (e.g., higher risk) analyzer score.

An analyzer score, as discussed herein, may be output by a machine learning model. The machine learning model may be trained as discussed herein. The machine learning model may be trained to output an analyzer score and/or components that contribute to an analyzer score. The machine learning model may output the analyzer scores or components of analyzer scores based on inputs including one or more message events, index attributes associated with the one or more message events, or the like or a combination thereof. The machine learning model may be trained, for example, based on historical analyzer scores, historical message events, simulated analyzer scores, simulated message events, and/or the like. An overall machine learning model may receive outputs from one or more machine learning models (e.g., one or more criteria machine learning models discussed above). The overall machine learning model may be configured to output an overall weight or coefficient based on one or more of the criteria machine learning models.

According to an implementation, an analyzer score for a given message event or associated with a destination address may be calculated if a threshold calculation value is reached. Each type of analysis performed by analyzer 110 (e.g., one or more of an MSISDN received count, a Prefix received count, a Prefix error rate, and/or an address classification) may have a corresponding threshold calculation value. For example, an MSISDN received count threshold calculation value may be 3, such that if the MSISDN received count is less than 3, then the MSISDN received count may not be considered when determining an analyzer score for the message event. However, if the MSISDN received count is 3 or greater, then the MSISDN received count may be considered when determining an analyzer score for the message event.

Analyzer scores determined by analyzer 110 may be stored at database 112 and may be associated with each respective message event and/or address corresponding to the analyzer scores. Risk calculation service 108 may receive a request to output a risk score for a destination address from a client via API 106. Risk calculation service 108 may request the analyzer scores associated with each of the event messages associated with the destination address, from database 112. In response, database 112 may transmit the analyzer scores associated with each of the event messages associated with the destination address to risk calculation service 108.

Risk calculation service 108 may determine a risk score for the destination address based on the analyzer scores associated with the destination address. The risk score may be determined by aggregating or averaging each of the analyzer scores associated with the destination address. Alternatively, or in addition, different weights may be applied to the different analyzer scores and a risk score may be determined based on the weighted analyzer scores. For example, risk calculation service 108 may apply a higher weight to analyzer scores corresponding to more recent message events and a lower weight to analyzer scores corresponding to less recent message events. Other factors that may determine a weight applied to analyzer scores may include those criteria discussed above and may further include client feedback, observed and/or detected fraud, reported fraud, deviation from expected traffic (e.g., over a period of time), comparison of the same, or the like or a combination thereof.

According to an implementation, the analyzer scores and/or associated indexed message event information may be provided as inputs to a machine learning model. The machine learning model may be trained to output a risk score based on the analyzer scores and/or associated indexed message event information. The machine learning model may be trained based on, for example, historical analyzer scores, historical associated indexed message event information, simulated analyzer scores, simulated associated indexed message event information, or the like.

Analyzer scores and/or risk scores may be numerical values (e.g., 0-100, 1-10, 0-1, etc.), ratios, percentages, tiers (e.g., high, medium, low), or any other applicable designations that can be distinguished from each based on a level of risk. A risk score may be based on analyzer scores associated with a given destination address, as disclosed herein. A risk score for a destination addressed may be capped at a maximum value (e.g., 100) and/or a minimum value (e.g., 0) such that it may not exceed the maximum and/or minimum value. A risk score may be a normalized or otherwise manipulated version (e.g., averaged, transformed, summed, etc.) of the combination of analyzer scores associated with a destination address.

A risk score for a given destination address may be updated based on new message events associated with the risk score. For example, a new message event associated with a destination address may be received at database 112. Analyzer 110 may analyze the new message event (e.g., in combination with other related message events) and may determine an analyzer score for the new message event. Risk calculation service 108 may request updated analyzer scores corresponding to the given destination address and may receive the analyzer score for the new message event. Accordingly, a new risk score may be calculated at least in part based on the analyzer score for the new message event. An existing analyzer score for a message event stored at database 112 may be updated based on new data from streaming system 102. According to an implementation, an existing message event and/or an analyzer score associated with the existing message event may be updated only if a new analyzer score is greater than a previous decayed score associated with the message event.

FIG. 1B depicts an exemplary system 160 for analyzing communication traffic using traffic analyzer 104, according to one or more embodiments, and which may be used with the techniques presented herein. System 160 is similar to system 100 of FIG. 1A and includes some components that have previously been described in reference to system 100. The example provided via system 160 utilizes an example Kafka streaming system. Although the Kafka streaming system is provided as an example, it will be understood that the subject matter disclosed herein is not limited to Kafka and any applicable streaming system 102 may be used to implement the subject matter disclosed herein.

As shown, system 160 includes a Kafka message-events topic component 120A which may receive message events from external sources (e.g., external source 120 of FIG. 1A). Kafka message-events topic component 120A may provide the message events to streaming system 102 and, more specifically, to a MessageLog-KafkaConsumer component 102A. MessageLog-KafkaConsumer component 102A may communicate with a TrafficFilterService 102B to filter message events on one or more streaming system 102 criteria. Streaming system 102 may provide message events (e.g., as SignalMessageEvent) to a Kafka Signals-Message-Events Topic component 102C which may generate a messageLog and provide the messageLog to traffic analyzer 104.

Traffic analyzer 104 may receive the messageLog at a MessageLogQueue 105A which may transmit the messageLog to VolumetricsDequeuer 105B. VolumetricsDequeuer 105B may communicate with BrandDetailsService 105C to determine if the message events included in the messageLog correspond to a given brand. If the message events included in the messageLog correspond to a given brand, then VolumetricsDequeuer 105B may associate the given brand with the message events in the messageLog at an extended messageLog. According to an implementation of the disclosed subject matter, message events associated with a same brand (e.g., client, client ID, an account identifier, etc.) may be analyzed as part of a same brand pool. Accordingly, message events associated with distributed services of a given brand may each by associated with the same brand pool to allow for a brand level analysis. Additionally, multiple brands may join a shared pool of event such that message events corresponding to brands that are part of the shared pool may each be analyzed in view of other message events associated with brands that are part of the shared pool.

VolumetricsDequeuer 105B may communicate with TrustedTrafficService 105D to determine if the message events included in the messaeLog include trusted traffic (e.g., based on a trusted address, trusted content, etc.). VolumetricsDequeuer 105B may associate a trust factor with the message events in the messageLog at the extended messageLog. The extended messageLog may be provided to database 112 at message_log 112H. VolumetricsDequeuer 105B may include inbound components to determine MSISDN type (e.g., a premium number, a VoIP number, a landline, etc.). Communication with VolumetricsDequeuer 105B and/or TrustedTrafficService 105D may be unidirectional.

Message_log 112H may provide the received extended messageLog to MessageLogProcessingService 104A which may aggregate and/or index the message events included in the extended messageLog. MessageLogProcessingService 104A may extract prefix information for addresses associated with message events and store the same at Prefix_Range component 112G. MessageLogProcessingService 104A may extract MSISDN information for addresses associated with message events and store the same at Subscriber component 112F. MessageLogProcessingService 104A may aggregate and process the event messages and provide them to Analysis_Aggregate component 112E which may provide them to analyzer 110 and a daily_analysis_aggregate component 112B, as further discussed herein.

Analyzer 110 may analyze the event messages in accordance with the techniques discussed herein. Analyzer 110 may generate analyzer scores associated with the message events and may provide the analyzer scores to Monitored_entity_analysis_event component 112D. Monitored_entity_analysis_event component 112D. May provide the analyzer scores to risk calculation service 108 that may determine risk scores for destination addresses in accordance with the techniques disclosed herein. Risk calculation service 108 may provide risk scores to a client 130 via API

106, as discussed herein. Client 130 may sanitize a destination address database based on the risk score (e.g., may remove a destination based on its risk score exceeding a threshold risk score) and/or may designate a given destination address for future monitoring.

As discussed herein, traffic to a given destination address may automatically be blocked based on a risk score associated with the destination address. Returning to FIG. 1B, risk calculation service 108 may provide calculated risk scores to risk analysis component 112C which may include a risk_score_results_log and/or a risk_score_analysis_event_log. Risk analysis component 112C may store and/or analyze risk scores that may be used, for example, to train or update a machine learning model. The risk scores may be applied to automatically block outgoing traffic by preventing outgoing messages to be sent to destination addresses having a risk score greater than a threshold risk score.

Daily_analysis_aggegate 112B, as discussed herein, may provide processed event messages to InternalRiskScoring-Service 108A. InternalRiskScoringService 108A may also receive the analyzer scores from Monitored_entity_analysis_event component 112D. InternalRiskScoringService 108A may determine internal risk scores for destination addresses. The internal risk scores may be calculated in the same or similar manner as the risk scores calculated by risk calculation service 108. For example, the internal risk scores may be calculated based on internal thresholds whereas the risk scores may be calculated based on client specific thresholds. The internal risk scores may be stored at internal risk score component 112A which may include an internal_risk_score_history, an internal_risk_score_event_history, an internal_risk_score_summary and/or the like. The internal risk scores may also be provided to a Kafka internal risk score (IRS) Topics component 102D that may cause them to be stored at clickhouse 102E which may include an internal_risk_score_history, an internal_risk_score_event_history, an internal_risk_score_summary and/or the like.

Table 1 includes example objects, object types, and object descriptions for objects discussed herein and/or as may be used to implement the techniques disclosed herein. It will be understood the objects, object types, and object descriptions of Table 1 are examples only and the implementations disclosed herein are not limited to these example objects, object types, and object descriptions.

TABLE 1

| Object | Type | Description |
|---|---|---|
| Monitored Entity - entities of interest - MSISDN or prefix range (e.g., approximately 1000 MSISDN numbers) | | |
| monitored_entity | TABLE | parent table for subscriber and prefix_range |
| subscriber | TABLE | contains MSISDN entries |
| prefix_range | TABLE | contains records for prefix ranges (e.g., approximately last 3 digits striped), so for reach prefix range entry there may be up to e.g., approximately1000 subscriber entries |
| Message Log/processing - Log of entries from Kafka and related processing procedures | | |
| message_log | TABLE | log of filtered and enriched messages from Kafka with relatively low retention period |
| message_log_processing | TABLE | temporary table for processing messages from message_log |
| copy_message_logs_to_message_log_processing | PROC | copies messages from message_log to message_log_processing as first part of message log processing |

TABLE 1-continued

| Object | Type | Description |
|---|---|---|
| create_missing_prefixes | PROC | part of message log processing, creates prefix_range entry if it doesn't exist |
| create_missing_subscribers | PROC | part of message log processing, creates subscriber entry if it doesn't exist |
| Analysis aggregate - aggregated values from ML used for performing analysis | | |
| analysis_aggregate | TABLE | contains aggregated messages from message_log and used as entry point for analysis |
| aggregate_message_logs | PROC | transforms entries from message_log_processing to analysis_aggregate table as part of message log processing scheduled job |
| analysis_details | TABLE | configurable values for each analysis (weight, decay, etc.) |
| brand_details | TABLE | details about brand (e.g., pool type) |
| Internal Risk Scoring - scoring preformed daily internally for monitoring and informational purposes | | |
| daily_analysis_aggregate | TABLE | temporary table for IRS that contains analysis_aggregate values for day that is being analyzed |
| internal_risk_score_history | TABLE | contains all subscriber/MSISDNs with calculated scores grouped by day as a result of IRS |
| internal_risk_score_summary | TABLE | summaries for each day of IRS from internal_risk_score_history - message and subscribers counts, suspicious message and subscribers counts . . . |
| internal_risk_score_event_history | TABLE | contains events that were contributing to the score for entries in internal_risk_score_history |
| fill_daily_analysis_aggregate | PROC | inserts data from analysis_aggregate to daily_analysis_aggregate as part of internal risk scoring |
| fill_internal_risk_score_summary | PROC | generates aggregated entries in internal_risk_score_summary table based on internal_risk_score_history |
| process_daily_analysis_aggregate_all | PROC | entry point function for internal risk scoring that will take care of batching and populate internal_risk_score_history based on daily_analysis_aggregate table |
| Events and analysis - events used for scoring and analysis that generate events | | |
| monitored_entity_analysis_event | TABLE | events that are used to calculate score, each entry is related to one of monitored_entity records referring to either MSISDN or prefix range |
| analyze_msisdn_received_count | PROC | analysis that generates events into monitored_entity_analysis_event table based on number of received messages per MSISDN |
| analyze_prefix_error_rate | PROC | analysis that generates events into monitored_entity_analysis_event table based on number of errors on prefix range |
| analyze_prefix_received_count | PROC | analysis that generates events into monitored_entity_analysis_event table based on number of received messages on prefix range |
| risk_score_analysis_event_log | TABLE | risk_score_result_log related events that were contributing to final score |
| risk_score_result_log | TABLE | final score is logged in this table for each request so they can be backtracked by signal_id column |

TABLE 1-continued

| Object | Type | Description |
|---|---|---|
| cleanup_analysis_events | PROC | deletes all no longer relevant (decayed) events from monitored_entity_analysis_event |
| save_analysis_event | PROC | inserts or updates monitored_entity_analysis_event |
| | Other | |
| scheduled_job_reservation | TABLE | utility table for synchronizing scheduled jobs |
| decayed_score | PROC | until function that calculates decayed score value |
| calculate_score_internal | PROC | calculates and returns score for single MSISDN |

Figure 2:
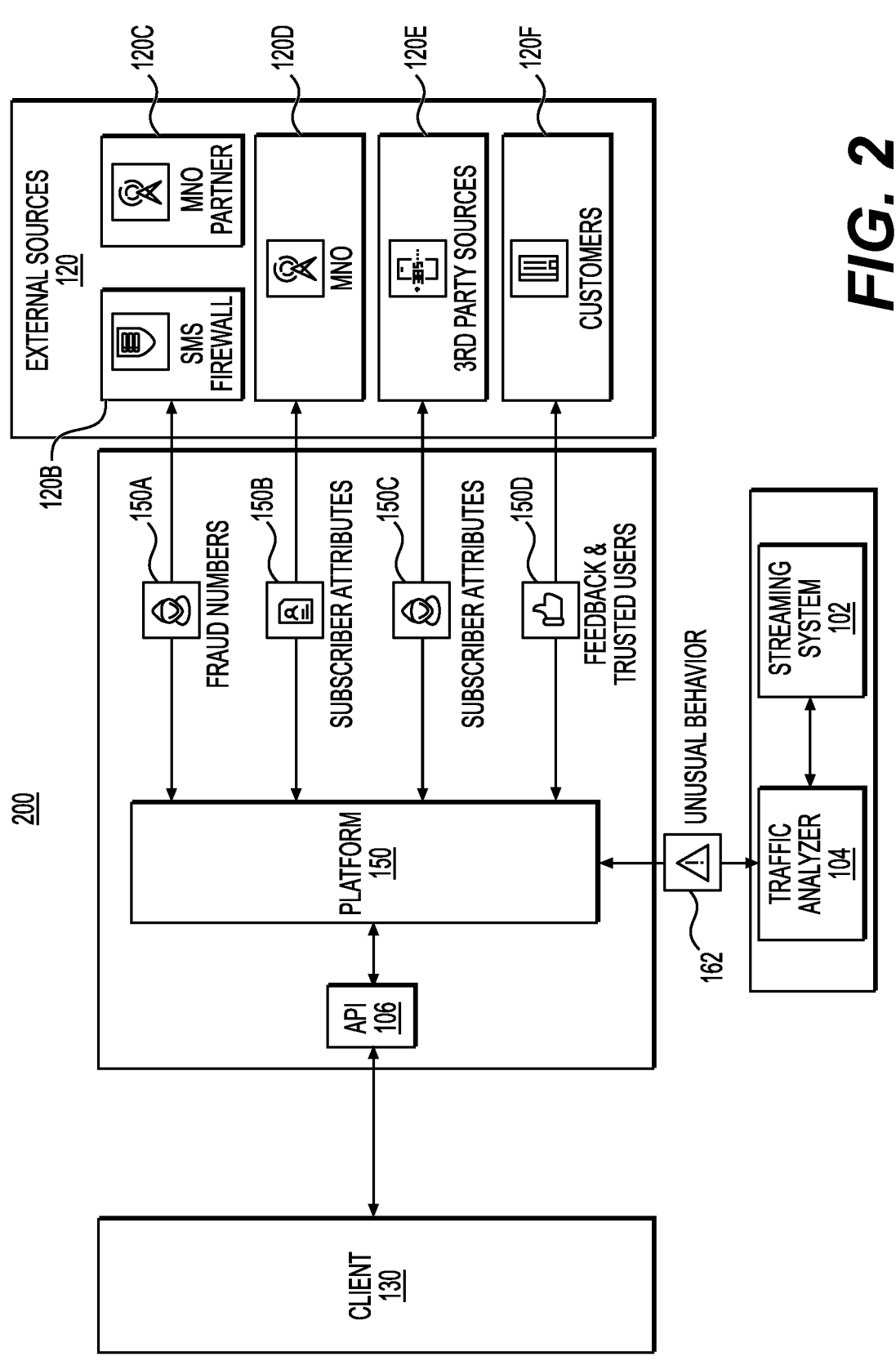
FIG. 2 depicts a system environment for communication traffic analysis, according to one or more embodiments.

FIG. 2 depicts a system environment 200 for communication traffic analysis in accordance with the subject matter disclosed herein. As shown, client 130 may request a risk score via API 106 that communicates with a platform 150. Platform 150 may be a client 130 facing component used to analyze traffic and/or generate events based on detected patterns. Platform 150 may be connected to external sources 120 such as an SMS firewall component 120B, an MNO partner 120C, an MNO 120D, other third party sources 120E, and/or customers 120F. Platform 150 may receive data from and/or transmit data to external sources 120. Such data may include, but is not limited to, fraudulent numbers 150A, subscriber attributes 150B, subscriber attributes from third party sources 160C, feedback and trusted users 150D (e.g., feedback that a blocked destination address should not be blocked), or the like.

Platform 150 may communicate with traffic analyzer 104 that may communicate with streaming system 102, as discussed herein. Unusual behavior 162 (e.g., high risk score destination address detection) may be flagged to platform 150 which may communicate the same with client 130 and/or external sources 120.

Figure 3A:
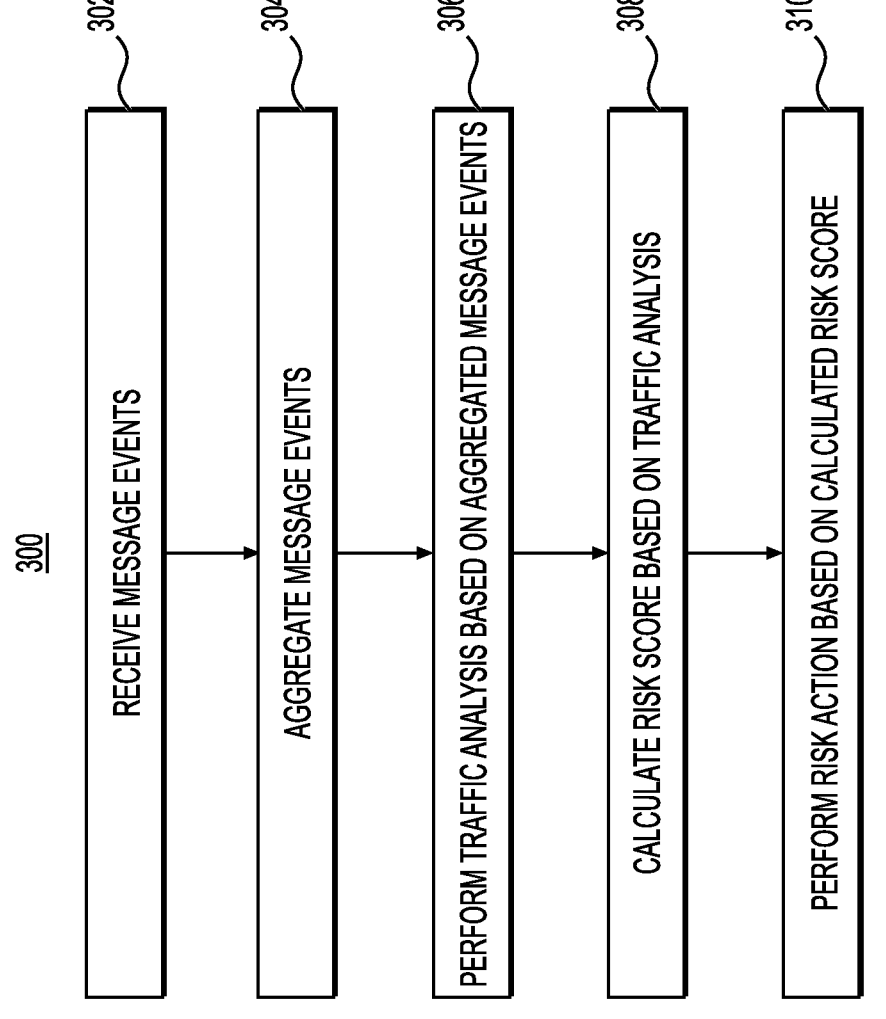
FIG. 3A depicts a flowchart for communication traffic analysis, according to one or more embodiments.

FIG. 3A depicts a flowchart 300 for communication traffic analysis, in accordance with the techniques disclosed herein. At step 302, message events may be received. For example, the message events may be received at traffic analyzer 104 from streaming system 102, as shown in FIG. 1A.

At step 304, the message events may be aggregated. For example, the message events may be aggregated at MessageLogProcessingService 104A of FIG. 1B. The aggregated message events may be stored at a database (e.g., database 112). The database (e.g., database 112) may associate message events with respective analyzer scores, as further discussed herein. An analyzer score association may be bound to a respective message event such that the analyzer score for the respective message may be transmitted along with the message event and/or attributes of the message event.

At step 306, traffic analysis may be performed based on the aggregated message events. The traffic analysis may be performed by analyzer 110 of FIGS. 1A and 1B. Analyzer 110 may apply one or more types of analyses to generate analyzer scores based on the traffic analysis, as disclosed herein. The analyzer scores may be stored at database 112 and may be associated with respective message events. As discussed herein, one or more machine learning models may be used to output an analyzer score for a given message event or multiple analyzer scores for each message event, where the multiple analyzer scores are used to output the analyzer score for the given message event.

At step 308, a risk score may be calculated based on the traffic analysis of step 306. For example, a risk score for a destination address may be calculated based on each of the analyzer scores associated with the destination address. A risk score may be generated based on a request received (e.g., via API 106) from a client. Alternatively, or in addition, a risk score may be generated based on an internal trigger. The risk score may be updated periodically, as discussed herein. The risk score may be updated automatically (e.g., upon expiration of a given amount of time), may be updated based on a trigger event (e.g., the receipt of a new message event associated with a destination), and/or may be updated at a rate output by a machine learning model. For example, a rate update machine learning model may determine a frequency to update a risk score for a given destination based on attributes associated with the given destination, a risk score for a destination, and/or based on message events associated with the given destination. For example, a given destination having a risk score higher than a risk score threshold may be flagged for a more frequent risk score update in comparison to a destination having a risk score lower than the risk score threshold. The rate update machine learning model may be trained based on historical or simulated destinations, message events, risk scores, and/or the like.

At step 310, a risk action may be performed based on the calculated risk scores. For example, the risk action may include providing the risk score to a client (e.g., via API 106). As another example, the risk action may include automatically blocking messages to be sent to a destination address based on the risk score. As another example, the risk action may include flagging the destination address for future or more frequent risk score analysis above a current frequency. For example, a risk score above a more stringent threshold may trigger automatically blocking messages to be sent to a respective destination address based on the risk score. A risk score between the first risk score threshold and a less stringent (e.g., lower) risk score threshold may result in flagging the respective destination address for more frequent risk score analysis above a current frequency. The frequency of risk score analysis may be determined, based on a scale ranging from the second risk score threshold and the first risk score threshold. According to this implementation, a destination having a risk score closer in value to the more stringent risk score threshold may correspond to a higher frequency of risk score analysis in comparison the frequency of analysis for a destination having a risk score closer in value to the less stringent (e.g., lower) risk score threshold.

Figure 3B:
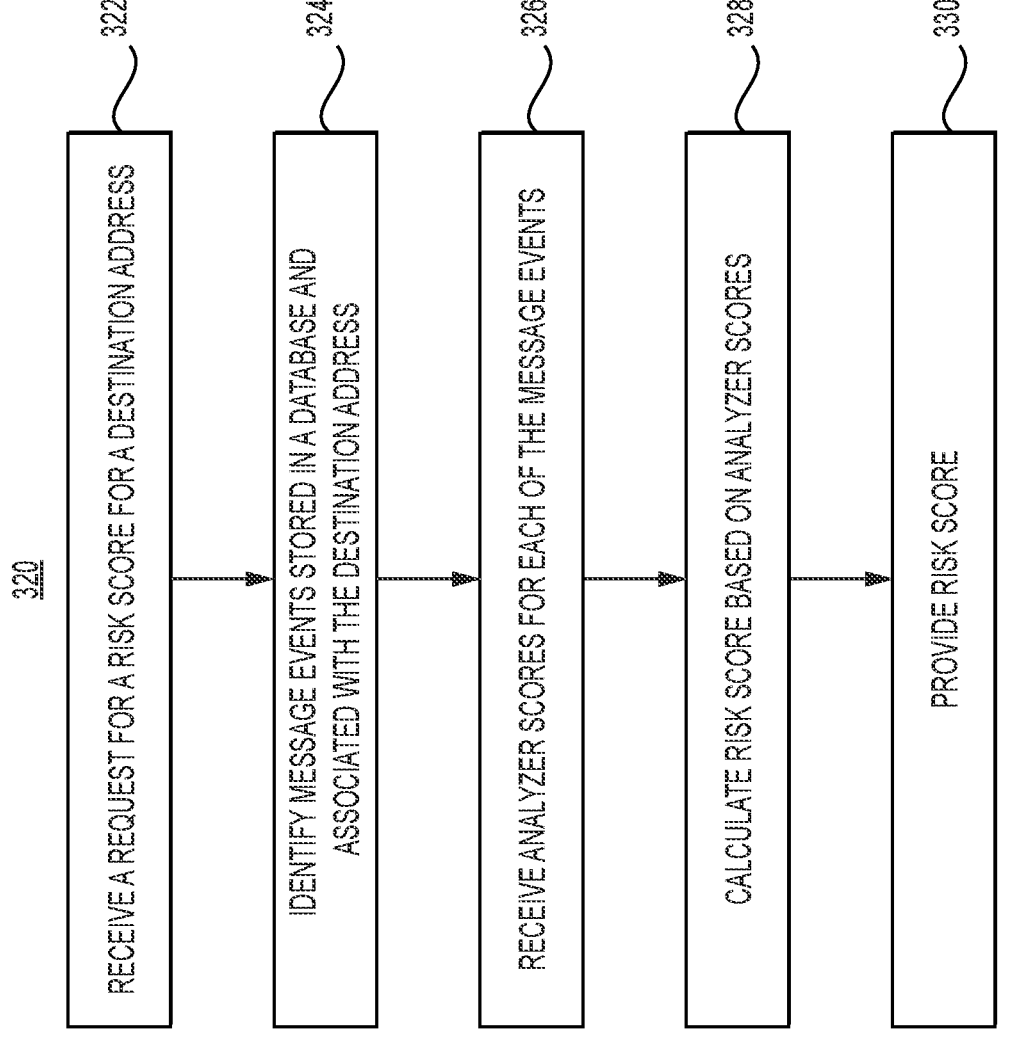
FIG. 3B depicts a flowchart for managing traffic data, according to one or more embodiments.

FIG. 3B depicts a flowchart 320 for managing traffic data. At step 322, a request for a risk score for a destination address may be received. The request may be provided by client 130 of FIG. 2, via API 106. The request may be received at traffic analyzer 104 of FIGS. 1A-2, as discussed herein.

In response to receiving the request at step 322, message events stored in a database (e.g., database 112 of FIGS. 1A and 1B) and associated with the destination address may be identified at step 324. The message events may be identified based on querying the database based on the destination address or properties associated with the destination address.

At step 326, analyzer scores for each of the message events identified at step 324 may be received. The analyzer scores may be received at risk calculation service 108 of FIGS. 1A and 1B. As discussed herein, each analyzer score of the analyzer scores may be output by an overall machine learning model. The overall machine learning model may output the analyzer scores based on outputs of a plurality of criteria machine learning models. The plurality of criteria machine learning models may generate a criteria machine learning output based on one or more of a traffic burst, a prefix range, a conversion information, a delivery rate, a message destination time clustering, a destination number of messages, a message frequency, a suspicious range, a destination type, a destination locale, a network anomaly, a brand interaction, a ported destination, an initiated message, and/or a client classification, as discussed herein.

At step 328, a risk score for the destination address may be calculated based on the analyzer scores for each of the message events. The risk score may be output by a machine learning model configured to output risk scores based on one or more analyzer scores for a given destination address. The risk score may be based on one or more weights, coefficients, decays, etc., as discussed herein.

At step 330, the risk score calculated at step 328 may be provided to a client or component. The risk score may be provided via API 106, as discussed herein. The risk score may be updated based on receiving updated analyzer scores for one or more of the message events and calculating an updated risk score based on the updated analyzer scores. An updated risk score may be provided, for example, via API 106.

According to an implementation, calculating the updated risk score may be triggered in response to receiving the updated analyzer scores for one or more of the message events. For example, database 112 may be updated to include new message events associated with the destination address. Based on receiving the new message events, new analyzer scores may be received (e.g., at step 326) and an updated risk score may be determined (e.g., at step 328). According to another implementation, an updated risk score may be determined periodically, such as based on the expiration of a predetermined time. The predetermined time may be output by a machine learning model and may be based on a first risk threshold, a second risk threshold, and/or a current risk score, as discussed herein.

One or more implementations disclosed herein may be applied by using a machine learning model. A machine learning model as disclosed herein may be trained using the system 100 of FIG. 1A, system 160 of FIG. 1B, environment 200 of FIG. 2, flowchart 300 of FIG. 3A, and/or flowchart 320 of FIG. 3B. As shown in flow diagram 410 of FIG. 4, training data 412 may include one or more of stage inputs 414 and known outcomes 418 related to a machine learning model to be trained. The stage inputs 414 may be from any applicable source including a component or set shown in FIGS. 1A-3. The known outcomes 418 may be included for machine learning models generated based on supervised or semi-supervised training. For example, the training data may be marked (e.g., by one or more users, using an algorithm, based on client feedback, etc.) as being associated with fraud or authorized traffic. The marked data may be used as annotations to train one or more machine models. For example, a first model might be trained using known fraudulent traffic, while a second machine learning model might be trained using known genuine traffic. An unsupervised machine learning model might not be trained using known outcomes 418. Known outcomes 418 may include known or desired outputs for future inputs similar to or in the same category as stage inputs 414 that do not have corresponding known outputs.

The training data 412 and a training algorithm 420 may be provided to a training component 430 that may apply the training data 412 to the training algorithm 420 to generate a trained machine learning model 450. According to an implementation, the training component 430 may be provided comparison results 416 that compare a previous output of the corresponding machine learning model to apply the previous result to re-train the machine learning model. The comparison results 416 may be used by the training component 430 to update the corresponding machine learning model. The training algorithm 420 may utilize machine learning networks and/or models including, but not limited to a deep learning network such as Deep Neural Networks (DNN), Convolutional Neural Networks (CNN), Fully Convolutional Networks (FCN) and Recurrent Neural Networks (RCN), probabilistic models such as Bayesian Networks and Graphical Models, and/or discriminative models such as Decision Forests and maximum margin methods, or the like. The output of the flow diagram 410 may be a trained machine learning model 450.

It should be understood that embodiments in this disclosure are exemplary only, and that other embodiments may include various combinations of features from other embodiments, as well as additional or fewer features.

Figure 4:
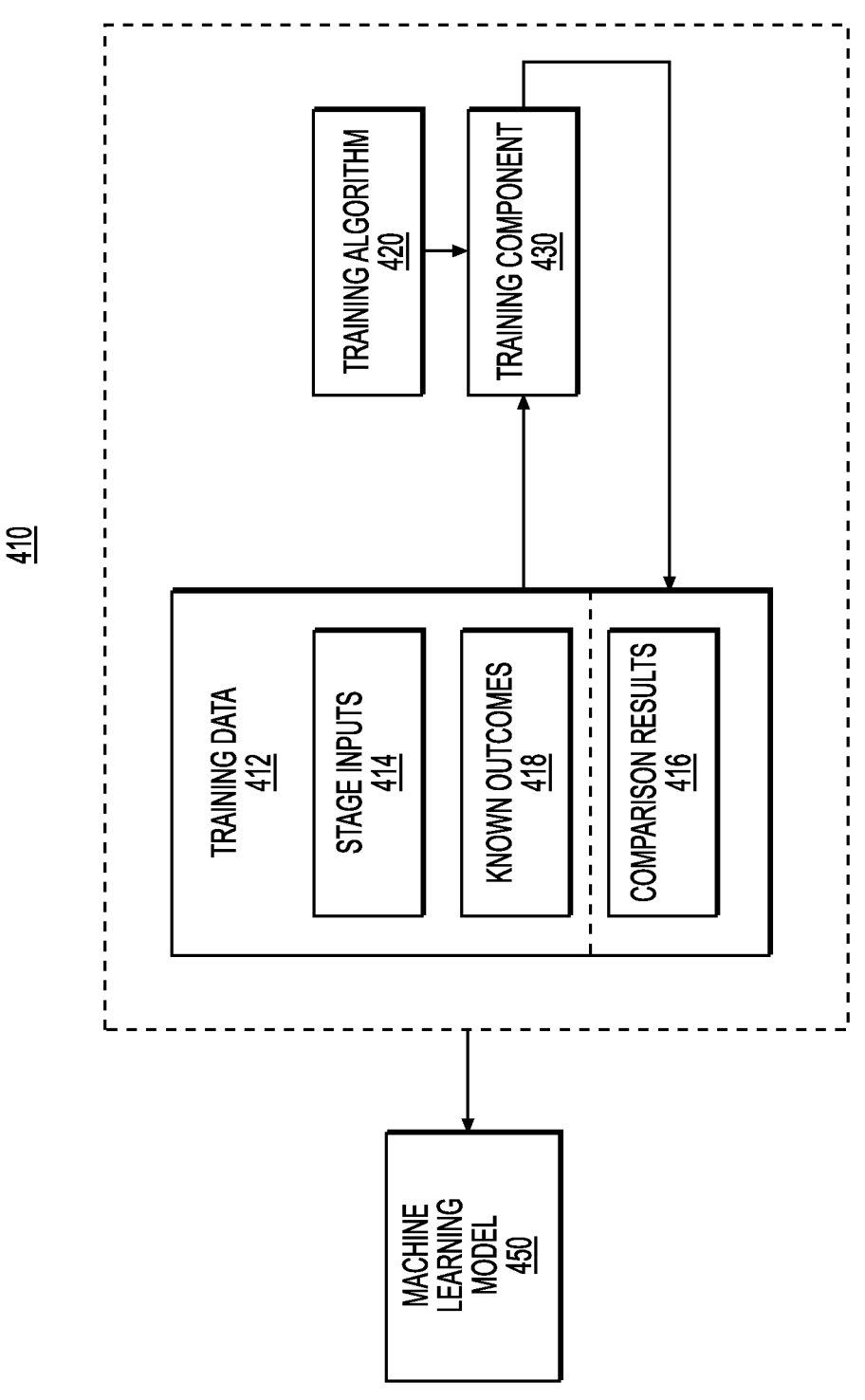
FIG. 4 depicts a flow diagram for training a machine learning model, according to one or more embodiments.

In general, any process or operation discussed in this disclosure may be computer-implementable, such as the processes illustrated in FIG. 3A, FIG. 3B, or FIG. 4, and may be performed by one or more processors of a computer system, such as any of the systems or devices in the exemplary system 100 of FIG. 1A or exemplary system 160 of FIG. 1B, as described above. A process or process step performed by one or more processors may also be referred to as an operation. The one or more processors may be configured to perform such processes by having access to instructions (e.g., software or computer-readable code) that, when executed by the one or more processors, cause the one or more processors to perform the processes. The instructions may be stored in a memory of the computer system. A processor may be a central processing unit (CPU), a graphics processing unit (GPU), or any suitable types of processing unit.

A computer system, such as a system or device implementing a process or operation in the examples above, may include one or more computing devices, such as one or more of the systems or devices in FIG. 1A and/or FIG. 1B. One or more processors of a computer system may be included in a single computing device or distributed among a plurality of computing devices. A memory of the computer system may include the respective memory of each computing device of the plurality of computing devices.

Figure 5:
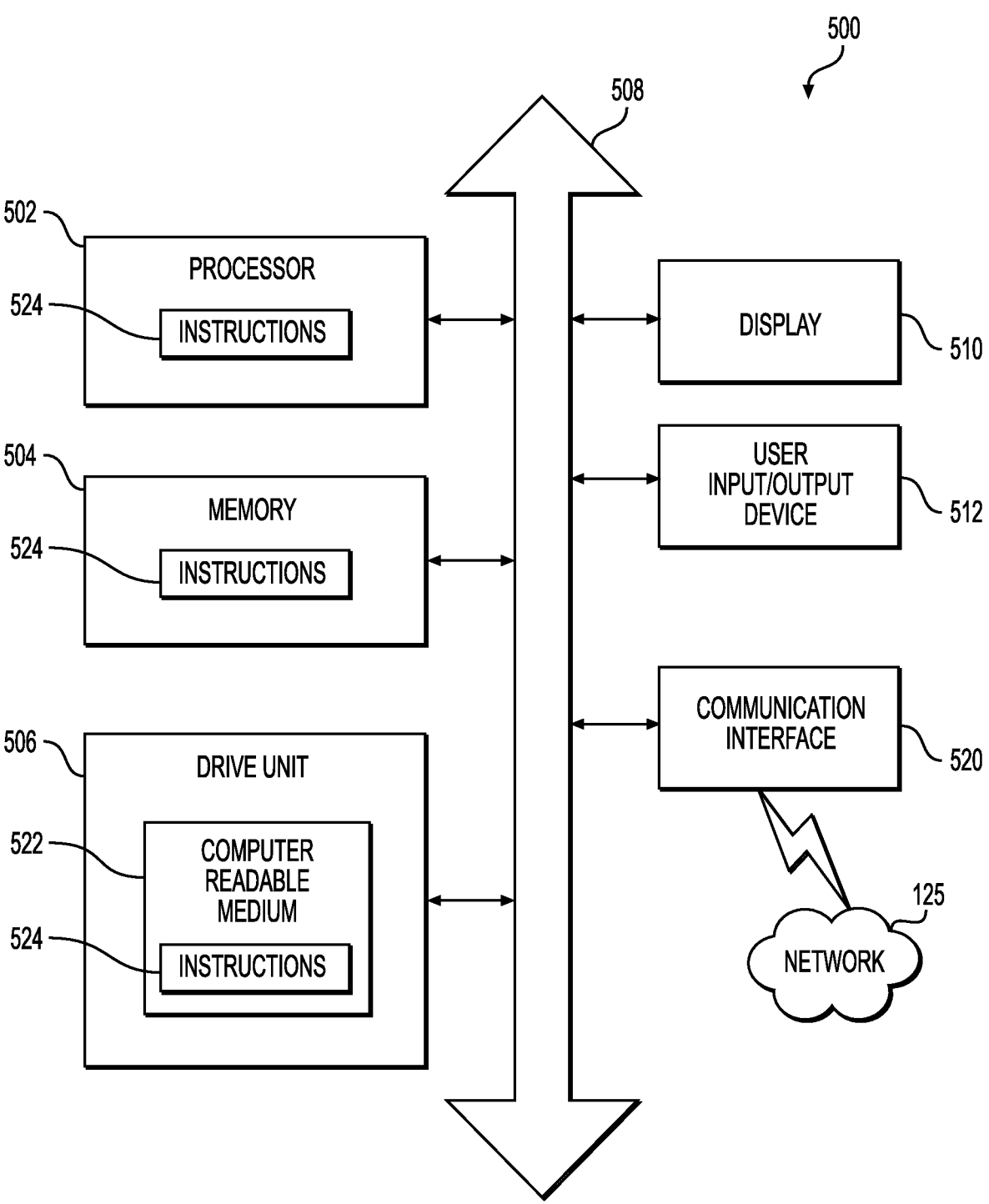
FIG. 5 depicts an example of a computing system, according to one or more embodiments.

FIG. 5 is a simplified functional block diagram of a computer system 500 that may be configured as a device for executing the techniques disclosed herein, according to exemplary embodiments of the present disclosure. Computer system 500 may generate features, statistics, analysis, and/or another system according to exemplary embodiments of the present disclosure. In various embodiments, any of the systems (e.g., computer system 500) disclosed herein may be an assembly of hardware including, for example, a data communication interface 520 for packet data communication. The computer system 500 also may include a central processing unit ("CPU") 502, in the form of one or more processors, for executing program instructions 524. The computer system 500 may include an internal communication bus 508, and a storage unit 506 (such as ROM, HDD, SDD, etc.) that may store data on a computer readable medium 522, although the computer system 500 may receive programming and data via network communications (e.g., over a network 125). The computer system 500 may also have a memory 504 (such as RAM) storing instructions 524 for executing techniques presented herein, although the instructions 524 may be stored temporarily or permanently within other modules of computer system 500 (e.g., processor 502 and/or computer readable medium 522). The computer system 500 also may include input and output ports 512 and/or a display 510 to connect with input and output devices such as keyboards, mice, touchscreens, monitors, displays, etc. The various system functions may be implemented in a distributed fashion on a number of similar platforms, to distribute the processing load. Alternatively, the systems may be implemented by appropriate programming of one computer hardware platform.

Program aspects of the technology may be thought of as "products" or "articles of manufacture" typically in the form of executable code and/or associated data that is carried on or embodied in a type of machine-readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer of the mobile communication network into the computer platform of a server and/or from a server to the mobile device. Thus, another type of media that may bear the software elements includes optical, electrical and electromagnetic waves, such as used across physical interfaces between local devices, through wired and optical landline networks and over various airlinks. The physical elements that carry such waves, such as wired or wireless links, optical links, or the like, also may be considered as media bearing the software. As used herein, unless restricted to non-transitory, tangible "storage" media, terms such as computer or machine "readable medium" refer to any medium that participates in providing instructions to a processor for execution.

While the presently disclosed methods, devices, and systems are described with exemplary reference to transmitting data, it should be appreciated that the presently disclosed embodiments may be applicable to any environment, such as a desktop or laptop computer, a mobile device, a wearable device, an application, or the like. In addition, the presently disclosed embodiments may be applicable to any type of Internet protocol.

It will be apparent to those skilled in the art that various modifications and variations can be made in the disclosed devices and methods without departing from the scope of the disclosure. Other aspects of the disclosure will be apparent to those skilled in the art from consideration of the specification and practice of the features disclosed herein. It is intended that the specification and examples be considered as exemplary only.

What is claimed is:

1. A method for analyzing traffic data, the method comprising:

receiving message events;

aggregating the message events to generate aggregated message events;

receiving a destination address;

performing traffic analysis for the destination address based on the aggregated message events, wherein the traffic analysis comprises determining, using an overall machine learning model, a respective analyzer score for each of the aggregated message events associated with the destination address, wherein the overall machine learning model is configured to output the respective analyzer score for each of the aggregated message events based on outputs of a plurality of criteria machine learning models;

calculating a risk score based on the respective analyzer score for each of the aggregated message events associated with the destination address;

performing a risk action for the destination address based on the risk score;

receiving updated analyzer scores for one or more of the aggregated message events;

calculating an updated risk score based on the updated analyzer scores, wherein calculating the updated risk score is triggered in response to receiving the updated analyzer scores for one or more of the aggregated message events; and providing the updated risk score via an application programming interface.

2. The method of claim 1, wherein the message events are received from a streaming system, and wherein the destination address represents a phone number.

3. The method of claim 1, wherein aggregating the message events comprises indexing the message events and storing the indexed message events at a database.

4. The method of claim 1, wherein aggregating the message events comprises associating at least a subset of the message events with a respective brand.

5. The method of claim 1, wherein performing the risk action comprises transmitting the risk score to a client.

6. The method of claim 1, wherein performing the risk action comprises automatically blocking a destination address based on the risk score exceeding a risk score threshold.

7. The method of claim 1, wherein performing the risk action comprises flagging a destination address for more frequent risk score calculation than a current frequency.

8. A system comprising:

a data storage device storing processor-readable instructions; and a processor operatively connected to the data storage device and configured to execute the instructions to perform operations that include:

receiving message events;

aggregating the message events to generate aggregated message events;

receiving a destination address;

performing traffic analysis for the destination address based on the aggregated message events, wherein the traffic analysis comprises determining, using an overall machine learning model, a respective analyzer score for each of the aggregated message events associated with the destination address, wherein the overall machine learning model is configured to output the respective analyzer score for each of the aggregated message events based on outputs of a plurality of criteria machine learning models;

calculating a risk score based on the respective analyzer score for each of the aggregated message events associated with the destination address;

performing a risk action for the destination address based on the risk score;

receiving updated analyzer scores for one or more of the aggregated message events;

calculating an updated risk score based on the updated analyzer scores, wherein calculating the updated risk score is triggered in response to receiving the updated analyzer scores for one or more of the aggregated message events; and providing the updated risk score via an application programming interface.

9. The system of claim 8, wherein the message events are received from a streaming system, and wherein the destination address represents a phone number.

10. The system of claim 8, wherein aggregating the message events comprises indexing the message events and storing the indexed message events at a database.

11. The system of claim 8, wherein aggregating the message events comprises associating at least a subset of the message events with a respective brand.

12. The system of claim 8, wherein performing the risk action comprises transmitting the risk score to a client.

13. The system of claim 8, wherein performing the risk action comprises automatically blocking a destination address based on the risk score exceeding a risk score threshold.

14. A method for managing traffic data, the method comprising:

receiving a request for a risk score for a destination address;

identifying aggregated message events stored in a database and associated with the destination address;

receiving a respective analyzer score for each of the aggregated message events, each respective analyzer score output by an overall machine learning model, the overall machine learning model outputting the analyzer scores based on outputs of a plurality of criteria machine learning models;

calculating a risk score for the destination address based on the respective analyzer score for each of the aggregated message events;

providing the risk score via an application programing interface (API);

receiving updated analyzer scores for one or more of the aggregated message events;

calculating an updated risk score based on the updated analyzer scores, wherein calculating the updated risk score is triggered in response to receiving the updated analyzer scores for one or more of the aggregated message events; and providing the updated risk score via the API.

15. The method of claim 14, wherein the plurality of criteria machine learning models are configured to generate a criteria machine learning output based on one or more of a traffic burst, a prefix range, a conversion information, a delivery rate, a message destination time clustering, a destination number of messages, a message frequency, a suspicious range, a destination type, a destination locale, a network anomaly, a brand interaction, a ported destination, an initiated message, or a client classification.

16. The method of claim 14, wherein one of the overall machine learning model or the plurality of criteria machine learning models is trained based on historical or simulated data.

17. The method of claim 14, wherein the request for a risk score is received via the API.

18. The method of claim 14, wherein the destination address represents a telephone number.

19. A method for managing traffic data, the method comprising:

receiving a request for a risk score for a destination address;

identifying message events stored in a database and associated with the destination address;

receiving analyzer scores for each of the message events, each analyzer score of the analyzer scores output by an overall machine learning model, the overall machine learning model outputting the analyzer scores based on outputs of a plurality of criteria machine learning models;

calculating a risk score for the destination address based on the analyzer scores for each of the message events;

providing the risk score via an application programming interface (API);

receiving updated analyzer scores for one or more of the message events;

calculating an updated risk score based on the updated analyzer scores, wherein calculating the updated risk score is triggered in response to receiving the updated analyzer scores for one or more of the message events; and providing the updated risk score via the API.

20. The method of claim 19, wherein the request for a risk score is received via the API.

21. A method for managing traffic data, the method comprising:

receiving a request for a risk score for a destination address;

identifying message events stored in a database and associated with the destination address;

receiving analyzer scores for each of the message events, each analyzer score of the analyzer scores output by an overall machine learning model, the overall machine learning model outputting the analyzer scores based on outputs of a plurality of criteria machine learning models;

calculating a risk score for the destination address based on the analyzer scores for each of the message events;

providing the risk score via an application programming interface (API);

receiving updated analyzer scores for one or more of the message events;

calculating an updated risk score based on the updated analyzer scores, wherein the calculating the updated risk score is triggered in response to an expiration of predetermined time; and providing the updated risk score via the API.

22. The method of claim 21, wherein the request for a risk score is received via the API.

\* \* \* \* \*